Sept. 15, 1964     D. H. CHADWICK     3,148,490
SAFETY GUARD FOR ROTARY MOWERS
Filed Jan. 11, 1963     2 Sheets-Sheet 1
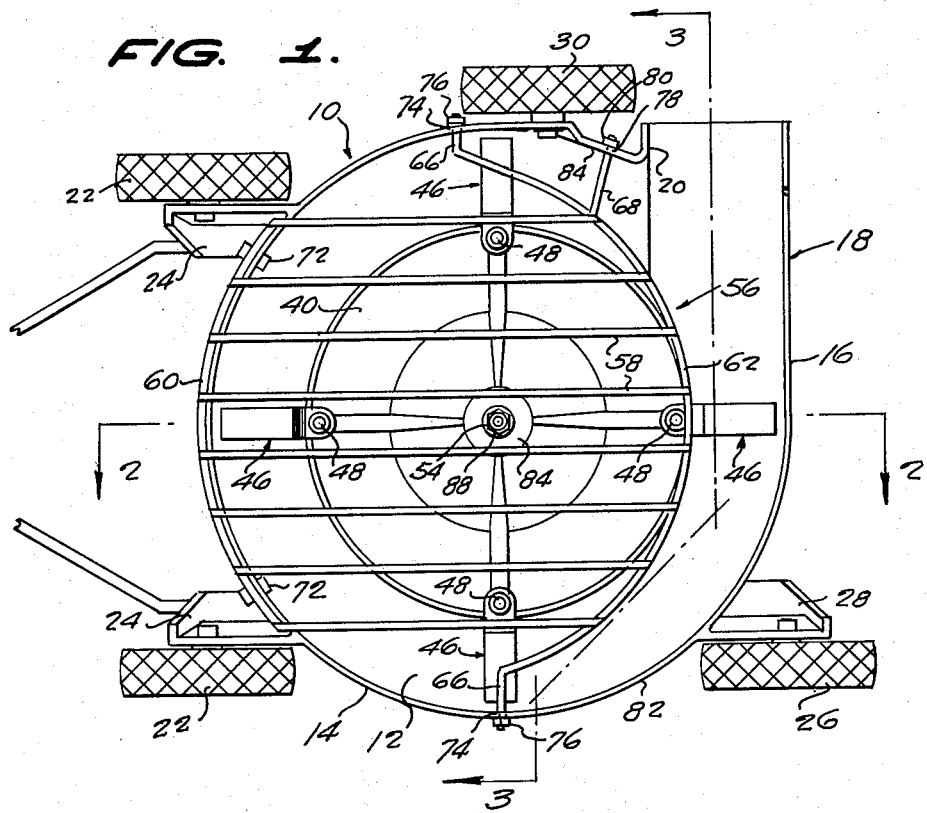
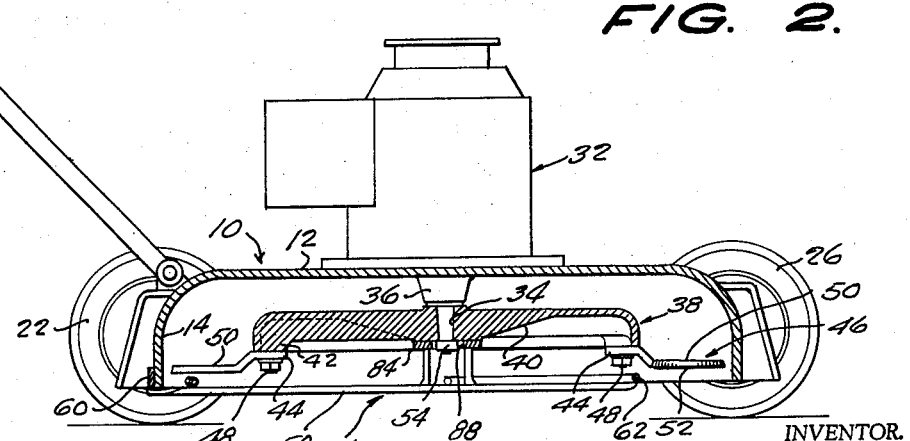
INVENTOR.
DAVID H. CHADWICK,
BY
McMorrow, Berman & Davidson
ATTORNEYS.

Sept. 15, 1964    D. H. CHADWICK    3,148,490
SAFETY GUARD FOR ROTARY MOWERS
Filed Jan. 11, 1963    2 Sheets-Sheet 2

INVENTOR.
DAVID H. CHADWICK,
BY
McMorrow, Berman & Davidson
ATTORNEYS.

United States Patent Office 3,148,490
Patented Sept. 15, 1964

---

3,148,490
SAFETY GUARD FOR ROTARY MOWERS
David H. Chadwick, 188 Bender Ave., East Alton, Ill.
Filed Jan. 11, 1963, Ser. No. 250,826
4 Claims. (Cl. 56—25.4)

This invention relates to a novel safety guard for rotary mowers.

The primary object of the invention is the provision of a functionally superior and more effective guard of the kind indicated, which is easily applied to and removed from a mower, and which, at the frontal cutting zone of the rotary cutter, does not press grass down, away from the cutter, so that the cutter can lift the grass and make a full cut, while offering full protection against injury by the cutter of the mower to a foot inadvertent put forwardly under the rear of the housing.

Another object of the invention is the provision of a guard of the character indicated above which involves no cross bars so that the drag which such cross bars produce, which makes a mower harder to push, is eliminated, together with unwanted depression of grass behind the frontal cutting zone of the mower's cutter.

Other important objects and advantageous features of the invention will be apparent from the following description and the accompanying drawings, wherein, for purposes of illustration only, a specific form of the invention is set forth in detail.

In the drawings:

FIGURE 1 is a bottom plan view of a rotary mower equipped with a safety guard of the present invention;

FIGURE 2 is a vertical longitudinal section taken on the line 2—2 of FIGURE 1;

Figure 3:
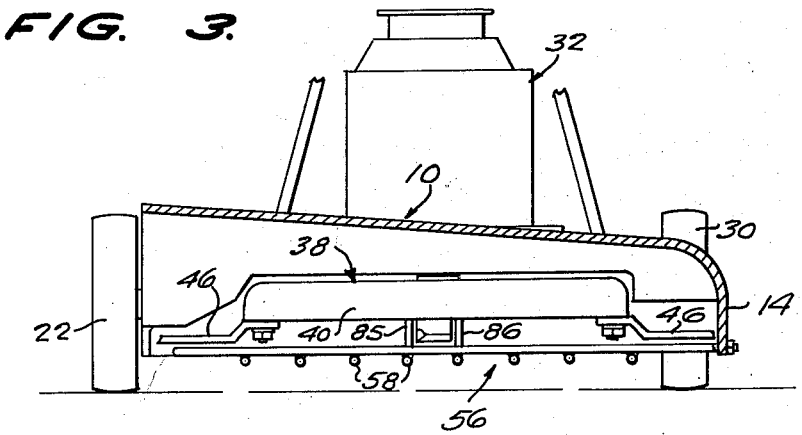
FIGURE 3 is a transverse vertical section taken on the line 3—3 of FIGURE 1.

Referring in detail to the drawings, wherein like numerals designate like parts throughout the several views, a substantially conventional form of rotary mower is shown, which comprises an inverted pan-shaped housing 10, having a flat top wall or deck 12, and a pendant semi-circular skirt 14 which, at the front thereof, merges into the forward straight transverse wall 16 of a cut grass discharge chute 18, having an abbreviated rear wall 20, at the open end of the chute.

The housing 10 is ground-supported on a pair of rear wheels 22 on brackets 24 extending rearwardly from the skirt 14, a left-hand front wheel 26 on a bracket 28 extending forwardly from the skirt, and on a right-hand wheel 30, journalled on the right-hand side of the skirt, behind the chute 18.

A motor 32 is mounted centrally on the housing top wall 12 and has a cutter shaft 34 journalled through a pendant boss 36, fixed to the underside of the top wall. A rotary cutter 38 is carried by the shaft 34, which comprises a disc 40 having on its underside, at its periphery, downwardly extending lugs 42, which are equally circumferentially spaced around the disc, to which the upset radially secured end portions 44 of radial blades 46 are bolted, as indicated at 48. The blades 46 have radial flat horizontal outer end portions 50 which reach close to the housing skirt 14, and have upwardly bevelled cutting edges 52. The cutter disc 40 is secured on the shaft 34, as by means of a nut 54.

Figure 4:
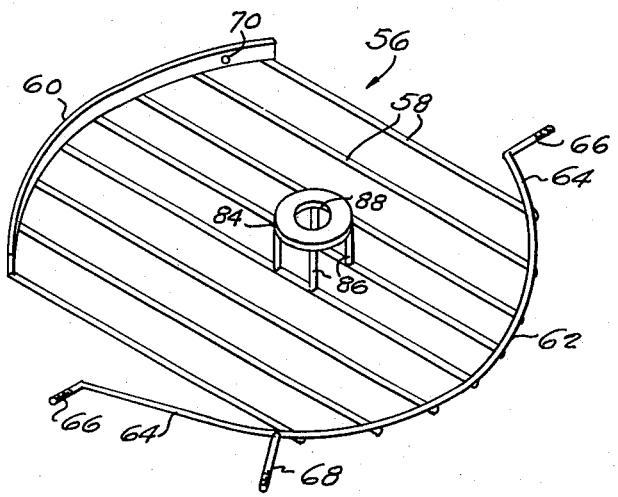
FIGURE 4 is a perspective view of the guard, per se.

The illustrated guard 56, as shown in FIGURE 4, comprises a plurality of straight, horizontal, parallel spaced, forwardly and rearwardly extending longitudinal rods 58, which, at their rear ends, are suitably fixed to the lower edge of an upstanding arcuate mounting bar 60, and, at their forward ends, to the underside of an arcuate support rod 62. The support rod 62 is longer than the mounting bar 60, which preferably spans only the width of the plurality of longitudinal rods 58.

The support rod 62 has terminal end portions 64 which reach laterally outwardly beyond the rods 58, and terminate in laterally outwardly extending threaded arms 66, which are horizontal and are diametrically aligned with each other. The support rod 62 has, adjacent the extreme right-hand longitudinal rod 58, a horizontal, radially outwardly extending intermediate threaded arm 68. The mounting bar 60 has bolt holes 70, adjacent to its ends.

The guard 56, which is shorter than the distance between the rear part of the housing skirt 14 and the forward chute wall 16, and is mounted in place by engaging the mounting bar 60 with the rear surface of the skirt and extending bolts 72 through the skirt and through the mounting bar bolt holes 70, so that the longitudinal guard rods 58 engage the lower edge of the skirt and extend forwardly on a line parallel with the ground and the lower edge of the skirt. The opposed threaded arms 66 are then passed outwardly through holes 74, provided in the skirt and nuts 76 threaded thereon, against the outer surface of the skirt. The intermediate arm 68 is then or at the same time passed out through a hole 78, provided in the skirt, adjacent to the chute 18, and a nut 80 is threaded thereon against the outer surface of the skirt.

This positions the support rod 62 in rearwardly spaced relationship to the forward chute wall, and in laterally inwardly and rearwardly spaced relationship to the inwardly curving forward portions 82 and 84, of the skirt 14, as shown in FIGURES 1 and 2, so that, as the mower is moved forwardly over the ground, the grass coming beneath the front of the housing 10, is not depressed or bent down by the support rod 62, but is lifted and cut by the cutter blades 46, which have their frontal cutting zone in the space between the support bar 62 and the forward chute wall 16.

The guard 56 has a centered upstanding pressure ring 84, fixed to the two middle rods 58, on upstanding rods 86, whose opening 88 spacedly receives the nut 54, on the lower end of the cutter shaft, with the ring 84 bearing upwardly against the underside of the cutter disc, whereby vibration of the guard, produced by the rotation of the cutter and passage of the mower over uneven ground, is substantially reduced or eliminated.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a rotary mower comprising an inverted pan-shaped housing having a horizontal top wall and a pendant substantially circular skirt, said skirt having an arcuate rear portion, a rotary cutter mounted within the housing and concentric with the skirt, said cutter comprising a disc having circumferentially spaced blades working close to the skirt, a guard secured to the skirt, said guard extending forwardly from the rear portion of the skirt, and an upstanding pressure ring on the guard and engaged with the underside of said disc, said guard comprising laterally spaced longitudinal horizontal rods having forward and rear ends, an arcuate mounting bar extending across and fixed to the longitudinal rods at their rear ends, said mounting bar being securably engaged with the rear surface of the rear portion of the skirt, a support bar fixed on the longitudinal rods at their forward ends, and means connecting the support rod to the housing skirt.

2. In combination, a rotary mower comprising an inverted pan-shaped housing having a horizontal top wall and a pendant substantially circular skirt, said skirt having an arcuate rear portion, a rotary cutter mounted within the housing and concentric with the skirt, said cutter comprising a disc having circumferentially spaced blades working close to the skirt, a guard secured to the skirt, said guard extending forwardly from the rear portion of the skirt, and an upstanding pressure ring on the guard and engaged with the underside of said disc, said guard comprising laterally spaced longitudinal horizontal rods having forward and rear ends, an arcuate mounting bar extending across and fixed to the longitudinal rods at their rear ends, said mounting bar being securably engaged with the rear surface of the rear portion of the skirt, a support bar fixed on the longitudinal rods at their forward ends, and means connecting the support rod to the housing skirt, said connecting means comprising radially outwardly extending threaded arms extending through openings provided in the skirt, and nuts threaded on the arms against the outer surface of the skirt.

3. In combination, a rotary mower comprising an inverted pan-shaped housing having a horizontal top wall and a pendant substantially circular skirt, said skirt having an arcuate rear portion, a rotary cutter mounted within the housing and concentric with the skirt, said cutter comprising a disc having circumferentially spaced blades working close to the skirt, a guard secured to the skirt, said guard extending forwardly from the rear portion of the skirt, and an upstanding pressure ring on the guard and engaged with the underside of said disc, said guard comprising laterally spaced longitudinal horizontal rods having forward and rear ends, an arcuate mounting bar extending across and fixed to the longitudinal rods at their rear ends, said mounting bar being securably engaged with the rear surface of the rear portion of the skirt, a support bar fixed on the longitudinal rods at their forward ends, and means connecting the support rod to the housing skirt, said support rod having end portions spaced laterally outwardly from the longitudinal bars and terminating in laterally outwardly extending threaded arms, said arms being engaged through openings provided in the skirt, and an intermediate threaded arm extending radially outwardly from the support rod forwardly of the said arms and engaged through an opening provided in the skirt, and a nut threaded on the intermediate arm against the outer surface of the skirt.

4. In combination, a rotary mower comprising an inverted pan-shaped housing having a horizontal top wall and a pendant substantially circular skirt, said skirt having an arcuate rear portion, a rotary cutter mounted within the housing and concentric with the skirt, said cutter comprising a disc having circumferentially spaced blades working close to the skirt, a guard secured to the skirt, said guard extending forwardly from the rear portion of the skirt, and an upstanding pressure ring on the guard and engaged with the underside of said disc, said guard comprising laterally spaced longitudinal horizontal rods having forward and rear ends, an arcuate mounting bar extending across and fixed to the longitudinal rods at their rear ends, said mounting bar being securably engaged with the rear surface of the rear portion of the skirt, a support bar fixed on the longitudinal rods at their forward ends, and means connecting the support rod to the housing skirt.

References Cited in the file of this patent

UNITED STATES PATENTS

| | | |
|---|---|---|
| 2,902,814 | Lewis et al. | Sept. 8, 1959 |
| 2,906,082 | Mathis | Sept. 29, 1959 |
| 2,934,882 | Kaut | May 3, 1960 |
| 3,038,289 | Cross | June 12, 1962 |